July 26, 1932.  E. L. PRIZER  1,868,914
METHOD AND APPARATUS FOR SUPPLYING SOLUBLE AGENTS TO LIQUIDS
Filed Oct. 5, 1931  2 Sheets-Sheet 1
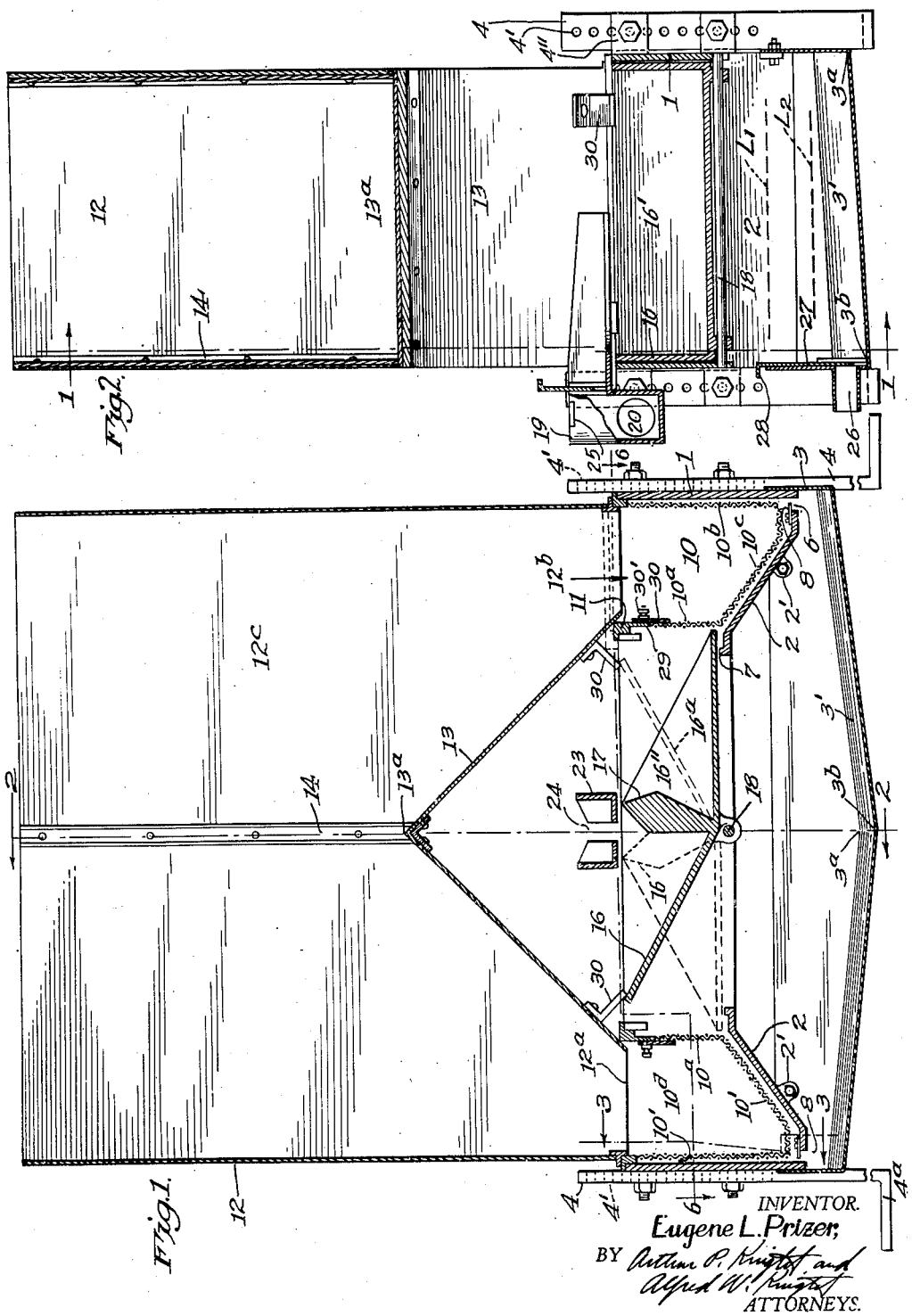
INVENTOR.
Eugene L. Prizer,
BY
ATTORNEYS.

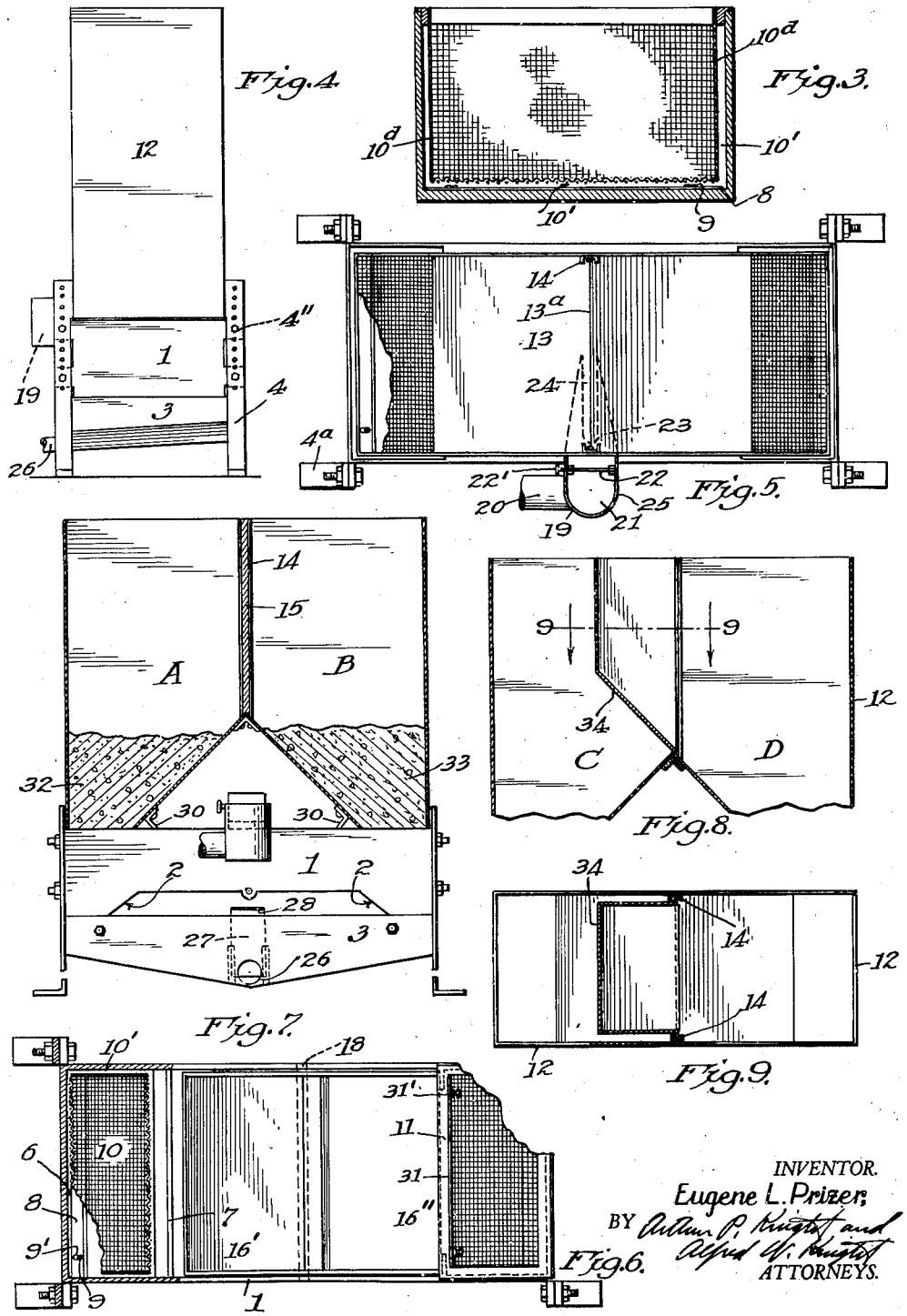

Patented July 26, 1932

1,868,914

UNITED STATES PATENT OFFICE

EUGENE L. PRIZER, OF SOLANA BEACH, CALIFORNIA, ASSIGNOR OF ONE-FOURTH TO JOHN A. PRIZER AND ONE-FOURTH TO DONALD C. JONES, BOTH OF FULLERTON, CALIFORNIA, AND ONE-SIXTH TO HARRY G. NUTT, OF ALTADENA, CALIFORNIA

METHOD AND APPARATUS FOR SUPPLYING SOLUBLE AGENTS TO LIQUIDS

Application filed October 5, 1931. Serial No. 567,115.

This invention relates to the supplying of soluble agents to liquids, and the principal object is to provide a method and apparatus for supplying water soluble agents, such as fertilizers, to a flowing stream of water which is to be used for irrigation purposes, in such manner that the concentration may be kept uniform and may be easily regulated, and in which relatively low pressure heads are required for proper operation of the device.

An important object of the present invention is to provide a simple method and an apparatus of simple and inexpensive construction, adapted to deliver a variable quantity of soluble agent solution of substantially uniform concentration to a stream of flowing liquid.

A specific object of the invention is to provide a method and apparatus in which definite quantities or units of liquid are diverted from the flowing stream of liquid, or from other suitable source, and each of said units is brought into contact with the soluble agent in such manner as to dissolve a given quantity thereof and form a solution unit of definite concentration, which is then returned to the flowing liquid stream, and to provide for control of the concentration of soluble agent in the flowing liquid stream by varying the time interval at which successive units of liquid are withdrawn and thus varying the number of solution units of definite quantity and concentration which are returned to the flowing liquid stream in a given period of time.

A further object of the invention is to provide an apparatus having a simple means of adjustably regulating the rate of supply of soluble agent to the flowing liquid.

A further object of the invention is to provide an apparatus of the above type and for the above use which will operate satisfactorily in connection with liquid flowing at substantially atmospheric pressure and which requires only a relatively low available hydrostatic head for operation thereof.

A specific object of the invention is to provide an apparatus adapted to be used in conjunction with open conduit irrigation systems, to effect solution of a suitable soluble agent by means of a relatively small quantity of water withdrawn from said conduit at substantially atmospheric pressure, passed through the apparatus and returned, as a solution of said agent, to said conduit under substantially atmospheric pressure at a point disposed at a somewhat lower gravity level.

A further object of the invention is to provide an apparatus in which the supply of soluble agent to be dissolved may be kept in a receptacle open to atmospheric pressure, either open top or provided with only a loose-fitting cover, so as to facilitate inspection of the supply of such material and replenishing of such supply when necessary.

A further object of the invention is to direct the liquid units into contact with the soluble agent with considerable force and velocity, so as to promote the dissolving of said agent thereby.

A further object of the invention is to provide a method and an apparatus adapted to alternately deliver successive portions of liquid withdrawn from a flowing stream of such liquid to two different soluble agents disposed in separate portions of said apparatus, so as to effect proportional solutions thereof and to return said liquid portions to said flowing stream, whereby two such soluble agents may be supplied to a flowing liquid stream in substantially constant proportions, independent of the rate of supply of such liquid to such apparatus.

The method of the present invention preferably comprises diverting definite measured portions of liquid from a flowing liquid stream, directing each of such liquid portions into contact with a soluble agent to dissolve a portion of such agent and form a solution unit of definite quantity and concentration, substantially draining or withdrawing each resulting solution unit from contact with the soluble agent before delivery of the next portion of liquid into contact therewith, and returning the solution units thus obtained to the flowing liquid stream to form a solution of definite concentration. For the purpose of regulation of the concentration of said solution, the method also comprises varying the time interval between the directing of successive liquid portions into contact with the soluble agent, and thus varying the frequency of delivery of said solution units to the flowing stream. It is not essential that the liquid units directed into contact with the soluble agent be diverted from the same liquid stream to which the solution units are delivered, as such liquid units may be obtained from any other suitable source of supply, but in general it will be found simplest to obtain such liquid units from said stream.

The apparatus of the present invention may comprise, in general, a receptacle for a soluble agent, perforate means disposed below said receptacle at each end thereof and in communication therewith so as to receive soluble agent therefrom by gravity, liquid supply means adapted to receive liquid from a flowing liquid stream or other suitable source, measuring means positioned to receive liquid from said liquid supply means and adapted to alternately deliver successive measured portions of liquid in dissolving contact with said soluble agent in each of said perforate receiving means, means below said perforate receiving means adapted to direct such delivered liquid portions downwardly out of contact with said soluble agent, tank means below said directing means adapted to receive said measured portions of liquid after said contact, and discharge means communicating with said tank means and said flowing liquid stream.

The soluble agent receptacle may be provided, if desired, with partition means dividing the same into two separate receptacles, whereby two different types of soluble agents may be separately subjected to solution, each of said agents being adapated to be delivered, by gravity, into one of said perforate soluble agent receiving means.

The apparatus may be further provided with adjustable means whereby the degree of solution of the soluble agent within the perforate receiving means may be varied within certain desirable limits so that when the apparatus is used to effect solution of two different types of soluble agents, the concentration of each agent in the delivered solution may be controlled.

Other important features and objects of the invention will be subsequently brought out in the description thereof or will be apparent therefrom.

The accompanying drawings illustrate an apparatus embodying the present invention and referring thereto:

Fig. 1 is a vertical section of the apparatus, showing the receptacle for the soluble agent, fluid measuring and delivery means, perforate soluble agent receiving means, and solution tank;

Fig. 2 is a vertical section thereof on line 2—2 in Fig. 1;

Fig. 3 is a sectional view thereof on line 3—3 in Fig. 1;

Fig. 4 is an end elevation of the device;

Fig. 5 is a plan view thereof;

Fig. 6 is a horizontal section thereof on line 6—6 in Fig. 1;

Fig. 7 is a partly sectional side view of the device, provided with partition means dividing the soluble agent storage receptacle into two separate receptacles;

Fig. 8 is a view of the storage receptacle portion of the device, provided with an alternative form of partition means dividing the soluble agent receptacle into two separate receptacles of unequal capacities;

Fig. 9 is a transverse section thereof on line 9—9 in Fig. 8.

The device of the present invention may comprise a structure as shown in the drawings, in which the numeral 1 indicates a rectangular frame, open at the top and bottom and provided with inwardly and upwardly sloping bottom wall portions 2 at each end thereof, said frame being preferably formed of cast iron or of relatively heavy gauge sheet metal so as to have a modicum of structural strength. The apparatus further comprises a rectangular open top tank member 3 depending from and secured to said frame as at 2'. Said tank member is preferably formed of light-weight sheet metal such as galvanized iron or the like, and is provided with a bottom wall 3' sloped inwardly and downwardly from each end toward the center and downwardly from one side to the other side as from 3a to 3b. The device is further provided with legs or supports 4 provided with a plurality of positioning holes 4' whereby said legs may be bolted, at any desired position of elevation, to lugs 4'" on the frame 1. The lower ends of the legs may be provided with laterally projecting foot members 4a, if desired, which foot members may serve to support the device from an elevated structure if desired, by removing the same and replacing them in inverted position. The apparatus may thus be hung in an irrigation weir, suspended upon such inverted legs and supported by the weir, substantially eliminating extra piping or fluid connections.

The upwardly sloping portions 2 of the frame 1 form, together with the respective end and side walls, a solution-cell housing at each end of the device, provided with an elongated opening or slot 6 adjacent the lowermost portion thereof, and an elongated splash bead 7 at the inner upper ends of the portions 2. Said housing may, if desired, be provided with means for varying the width of the slot 6, which may comprise a movable plate 8 secured to the portions 2 adjacent said slot by means of screws 9 extending through slots 9' in said plate. Said plate is thus adjustably movable so as to vary the degree of opening of the slot 6.

The device is provided with a perforate-walled solution-cell 10 disposed within each of the solution-cell housings, said cells being provided with a flanged rim 11 adapted to fit within and be supported by the upper edge of said housing, said solution-cells being formed with an open upper end and the inner and outer vertical walls, 10a and 10b, and bottom sloping wall 10c thereof being formed of suitable screen material. The side walls 10d are shown as formed of light weight sheet metal but may, if desired, be also formed of screen material. The solution-cells are, further, preferably of such dimensions as to be slightly spaced from the corresponding walls of the solution-cell housing on all sides so as to leave a space 10' therebetween, the purpose of which will be subsequently pointed out in the description of the operation of the device.

The solution-cells are preferably further provided with partition means 29 at the inner wall thereof, the general construction and utility of which will be subsequently described.

A suitable soluble agent receptacle is provided for the device which may comprise a bin 12 provided with a centrally disposed bottom wall 13 inclined downwardly and outwardly each side of a central raised portion 13a to form openings 12a and 12b one disposed substantially above the open top of each solution-cell 10 so that any suitable soluble agent disposed in said bin will be directed downwardly into said solution-cells. The bin is preferably provided with suitable guide rails such as a channel rail 14 extending vertically upwardly from the raised portion 13a of the bottom wall 13 on each of the side walls 12c of said bin, adapted to receive a partition 15 (Fig. 7) so as to obtain a division of the bin into two separate bins A and B (Fig. 7). The bin 12 is adapted to rest upon and be supported by the flanged rims 11 of the solution-cells 10 so that the openings 12a and 12b are directed substantially into the respective solution-cells.

A suitable measuring device for delivering liquid to the solution-cells 10 is provided for the apparatus, which measuring device may comprise a measuring bucket 16 formed with two similar compartments 16' and 16" separated by a partition 17 and rotatably supported intermediate the solution-cell housings in the frame 1 by means of shaft 18, said bucket being adapted to tip from a position such as is shown in solid lines at 16, Fig. 1, to that shown in dotted lines at 16a. The apparatus is also provided with liquid supply means comprising a weir box 19, adapted to deliver liquid to the measuring bucket 16, and said weir box may be of the form shown, which comprises a liquid inlet pipe 20, a reservoir 21, a slide valve or gate 22, said reservoir being provided with a set screw 22' for positioning said gate, and a chute 23 having a central discharge slot 24. The reservoir 21 is preferably also provided with an overflow 25. The weir box 19 is preferably so disposed with respect to the bucket 16 that the central slot 24 is disposed substantially vertically above the axis of rotation of the bucket 16 so as to be in position to discharge liquid into the compartment 16' when the bucket is in position shown at 16, and to be in position to discharge liquid into the compartment 16" when the bucket is in position as shown at 16a.

A suitable solution discharge pipe 26 is provided for the tank 3 adjacent the lowermost portion thereof, which discharge pipe is provided with a slide valve or gate 27 having an operating handle 28 extending upwardly therefrom and projecting outside the tank over the upper edge of the side wall thereof, whereby said valve may be adjusted from outside the device during operation thereof.

In the operation of the device of the present invention, the inlet pipe 20 is connected to a suitable liquid supply, for example, when the device is used to supply soluble fertilizing agents to irrigation waters, the pipe may lead from an open trough, ditch or other conduit, and the discharge 26 may be connected to the same or another conduit at a point at a slightly lower level than the point of supply so that the solution may flow from the tank 3 into said other conduit. The difference in level of the supply and discharge points is not required to be very great, and may be as little as 6 to 12 inches, according to the design of the apparatus.

Water may be then directed into the weir 19 and the flow thereof from the weir to the device may be regulated by the valve 22. The water will flow into the chute 23, through the slot 24 and into, for example, the compartment 16'. Upon this compartment being filled to the upper edge, the weight thereof will overbalance the bucket, and cause the same to tip to the position shown at 16a.

The design of said bucket is preferably such that the center of gravity thereof will not shift to the loading side thereof until the loading compartment is substantially completely filled and the bucket is preferably of heavy construction and of such design that when the device begins to tip in the above described fashion, the travel of said bucket is very rapid and positive. The center partition 17 is preferably of relatively heavy construction so that considerable weight is concentrated in close proximity to the vertical plane of the pivotal axis of the measuring bucket, and the upper portion of said partition is preferably enlarged so as to provide a maximum average distance from the mass of said partition to the pivotal axis thereof, whereby, upon a filling compartment becoming filled, and a downward movement thereof started, the shift of the weight of the partition means to the opposite side of the axis of rotation will cause a rapid acceleration of the movement thereof and thus cause the bucket to move to its new position with considerable celerity.

The above feature provides, due to this rapid movement of the measuring bucket, (a) attainment of considerable momentum of the bucket which is, as above stated, of heavy construction, whereby a heavy forcible impact may be obtained between the outer edge of said bucket and a stop member 30 provided on the bottom wall 13 of the bin, obtaining a substantial jarring action which serves to cause the soluble material therein to progress downwardly into the solution-cells 10; and (b) direction of the liquid contained in the descending compartment into dissolving contact with the soluble agent in the solution-cell with considerable force and velocity, due to the release toward said solution-cell of a relatively large body of liquid in a relatively short time.

As the water is discharged from the loaded bucket compartment, it is flushed towards the solution-cell 10 as above described, into the space 10′, and through the perforations of the screen walls into dissolving contact with the soluble agent within said cell. The water then drains out of the solution-cell down through the discharge slot 6 into the tank 3, continually dissolving the soluble agent during such draining and is then delivered from said tank to the desired location in the irrigation system through the discharge 26.

As one solution-cell is draining, the compartment on the opposite side is filled with water from the weir box 19 in the same manner as was the first-filled compartment, and, upon said opposite compartment being filled, the bucket is given a tip in the opposite direction and the measured portion of water is discharged into the opposite solution-cell in the same manner as above, the operation repeating itself as long as the supply of water to the weir 19 is maintained, jarring of the bin 12 being obtained each time a compartment is discharged.

The relative size of the measuring compartments 16′, 16″ and the solution-cell housing are preferably such that the amount of liquid which one of said compartments may discharge does not exceed the volume capacity of the solution-cell housing below the level of the splash bead 7, whereby the measured portion of liquid may be substantially entirely delivered into the said cell without loss thereof by overflow.

The discharge slot 6 in the bottom of each solution-cell housing is preferably of such dimensions that the liquid delivered into contact with the soluble agent will be drained from the solution-cell at such rate as to substantially empty the same by the time a fresh measure of liquid is delivered thereto, even at the maximum rate of operation of the device, whereby maximum dissolving contact of the soluble agent by the liquid is obtained by each measure thereof without danger of overflow of the solution-cell upon delivery of a new measure of liquid thereto.

The slot 6 may be adjusted, as above described, so as to vary the rate of discharge of the solution from the solution-cell housings when it is desired to alter the concentration of dissolved agent in the solution delivered to the tank 3. By opening the slot to a greater width, it will be seen that the liquid will not be allowed to remain in contact with the solute for as great a length of time, and the concentration of said solute in the liquid drained from the solution-cell will be lower.

The valve 27 is provided for the purpose of regulating the outflow of solution from the tank 3 so that a reserve of such solution is held in the tank and a substantially uniform flow thereof through the discharge 26 is realized. The solution may thus be regulated between the levels $L_1$ and $L_2$ in the tank 3 and the outflow through the discharge 26 maintained substantially free of pulsations in flow due to the intermittent discharge from the solution-cells.

The alternate outflowing of solution from the respective solution-cell housings obtains an important cross-circulation in the tank 3 which is common to both housings whereby any minute or partially dissolved particles of solute which are washed through the screen-openings into said tank are subjected to sufficient agitation to complete the solution thereof in said tank.

An important feature of the device is that, the concentration of the dissolved soluble agent in the flow of solution from the discharge 26 may be maintained substantially constant inasmuch as the time of contact of the soluble agent by a measured portion of the liquid is the same, independent of the rate of operation of the device, the time of draining of the solution-cells is substantially constant with a particular adjustment of the partitions 31 and the slot 6 and the pressure and velocity of the liquid contacting said soluble agent is always the same. The rate of through-put of the liquid is the only variable factor and may be manually adjusted to any desired quantity within the limits of the device.

Another important feature of the device is in that of the forcible flushing of the water inwardly through the screen openings whereby said openings are kept clean and open and caking of the soluble agent thereon is substantially eliminated. The rate of solution of the soluble agent may be regulated by changing the solution-cells 10, using a coarse screen structure for rapid solution and a fine screen for slow solution, for example.

A further feature of the device is that of utilizing the inertia of the rapidly moving measuring bucket to obtain a forcible jarring of the soluble agent in the receptacle, whereby said agent is constantly caused to move downwardly into the solution-cells as solution is effected, as above described.

The solution-cells are each provided with a fixed partition 29 extending across the upper portion of the inner wall 10a so as to substantially prevent splashing of liquid upwardly into the body of soluble agent in the lower part of the storage receptacle, and said cells are preferably further provided with a vertically adjustable partition 31, adjustably secured to said fixed partition by means of thumb-screws 31', said partition 31 being provided with suitable slots, not shown, through which said screws may project. Vertical adjustment of the partition 31 will allow of a variation in the rate at which liquid is forced into the solution-cells, that is, when the partition is raised to the upper limit, a maximum amount of liquid is allowed to pass through the screen walls of the solution-cells, and, when the partition is lowered to the lower limit, a minimum amount of liquid is allowed to enter the solution-cells, a large portion of such liquid being forced to pass directly through the bottom clearance space 10' out through the slots 6.

It will be understood that with the present construction, liquid is not constantly maintained in the solution-cells, and, the liquid being drained therefrom after the delivery of each measured portion of liquid into dissolving contact therewith, the consumption of the solute within the solution-cell is progressive and the tendency for the liquid to be drawn upwardly into the solute mass in the receptacle by capillarity is overbalanced by the downward movement of fresh solute into the solution-cells to replace the dissolved solute.

The device may be operated, as shown in Fig. 7, with the partition 15 in place in the receptacle, dividing the same into two separate and substantially equal receptacles A and B adapted to separately receive two different types of soluble agents 32 and 33. The measured portions of liquid will thus be alternately discharged into contact with one such agent and then the other, obtaining a much more accurate intermixing of the two separate agents in the solution phase than would be practical to obtain by intermixing the solid agents and charging the mixture in one bin. Further, as the partitions 31, the size of the slot 6 and the character of the screens forming the walls of the solution-cells may all be varied to obtain practically any desired rate of solution in a particular solution-cell, the rate of solution of the respective solutes may be adjusted to give the desired concentration of each in the resulting solution mixture. Due to the common differences in solubility of different soluble agents, it is not practical to mix the same in dry form and then subject the mixture to solution, as one of the constituents of said mixture would be dissolved more rapidly than the other and a consequent ununiformity of the concentrations of each solute in the solution resulting therefrom would be realized. With the use of the present invention, accordingly, not only is preliminary intermixing of the separate agents unnecessary, but positive control of the concentrations of each is possible.

When it is desired to add considerably more of one soluble agent to a liquid than of another, such as, for example, when it is desired to add one part of a phosphate fertilizer and two parts of a nitrate fertilizer at one time, a partition such as is shown at 34 in Figs. 8 and 9 may be used, so as to divide the soluble agent receptacle into two unequal parts C and D which will allow of storage of the extra amount of the nitrate agent necessary.

The device of the present invention, in view of the above, is particularly adapted for use in connection with open conduit irrigation, where high pressure heads are lacking and under which conditions the conventional type of device utterly fails to function. It is seen that, in spite of only a matter of inches of water head being available or necessary for the operation of the device, the flushing action of the sudden discharge of liquid into dissolving contact with the soluble agent obtains uniform solution thereof and occasions no difficulty of operation. There are normally numerous places in an open conduit irrigation system which offer a pressure difference of a foot or so, such as points where lateral distribution conduits are drawn off a main conduit, and is normally convenient to place the device of the present invention at such positions.

I claim:

1. A method for supplying soluble agents to flowing liquids which comprises directing successive measured portions of liquid into dissolving contact with a body of soluble agent, so as to successively form thereby solution units of definite quantity and concentration of soluble agent, causing said solution units to be removed from contact with said soluble agent, and delivering said successive solution units to a flowing stream of liquid.

2. The invention as set forth in claim 1, each of said solution units being substantially completely withdrawn from such dissolving contact during the interval between delivery of successive portions of said liquid.

3. The invention as set forth in claim 1, the rate of withdrawal of said solution units from said dissolving contact being so controlled as to determine the concentration of soluble agent therein.

4. A method for supplying soluble agents to flowing liquids which comprises alternately directing successive measured portions of liquid into dissolving contact with separate bodies of soluble agent, so as to alternately form by such contact, solution units of definite quantity and concentration of each of said bodies of soluble agents, causing alternate delivery of said solution units into a common receptacle out of contact with said bodies, and delivering said alternately delivered solution units compositely to a flowing liquid stream.

5. The invention as set forth in claim 4, each of said solution units being substantially completely withdrawn from such dissolving contact during the interval between delivery of succesive portions of said liquid.

6. The invention as set forth in claim 4, the rate of withdrawal of said solution units from said dissolving contact being so controlled as to determine the concentration of soluble agent therein.

7. A method for supplying soluble agents to flowing liquid which comprises alternately directing successive measured portions of liquid into dissolving contact with separate bodies of different soluble agents, so as to form by such contact, solution units of definite quantity and concentration of each of said different agents, causing alternate delivery of said solution units into a common receptacle out of contact with said agents to form a mixed solution thereof, and delivering said mixed solution to a flowing liquid stream.

8. The invention as set forth in claim 7, each of said solution units being substantially completely withdrawn from such dissolving contact during the interval between delivery of successive portions of said liquid.

9. The invention as set forth in claim 7, the rate of withdrawal of said solution units from said dissolving contact being so controlled as to determine the concentration of soluble agent therein.

10. A method for supplying soluble agents to flowing liquids which comprises alternately directing successive measured portions of liquid into dissolving contact with separate bodies of different soluble agents, controlling said dissolving contact of said alternate liquid portions with each of said bodies so as to obtain solution units of said separate bodies of definite quantity and concentration of said agents, alternately delivering said solution units out of contact with said agents into a common receptacle to form a mixed solution thereof, and delivering said mixed solution to a flowing liquid stream.

11. The invention as set forth in claim 10, each of said solution units being substantially completely withdrawn from such dissolving contact during the interval between delivery of successive portions of said liquid.

12. The method of supplying soluble agents to liquids which comprises diverting definite measured portions of liquid from a flowing liquid stream, directing each of said liquid portions into contact with a soluble agent to dissolve a portion of such agent and form a solution of definite quantity and concentration, and returning the solution units thus obtained to the flowing liquid stream to form a solution of definite concentration.

13. The invention as set forth in claim 12, regulating the concentration of said solution by variation of the time interval between the directing of successive liquid portions into contact with the soluble agent.

14. An apparatus for supplying soluble agents to liquids comprising a receptacle for a soluble agent, two perforate means disposed below said receptacle at opposite ends thereof and in communication therewith so as to receive soluble agent therefrom by gravity, liquid supply means, measuring means positioned to receive liquid from said liquid supply means and adapted to alternately deliver successive measured portions of liquid into dissolving contact with said soluble agent in each of said perforate receiving means, means below said perforate receiving means adapted to direct such delivered portions downwardly out of contact with said soluble agent, and tank means below said directing means adapted to receive said measured portions of liquid after such contact.

15. An apparatus for supplying soluble agents to liquids comprising a receptacle for a soluble agent, two perforate means disposed below said receptacle at opposite ends thereof and in communication therewith so as to receive soluble agent therefrom by gravity, liquid supply means open to atmospheric pressure, measuring means positioned to receive liquid from said liquid supply means and adapted to alternately deliver successive measured portions of liquid into dissolving contact with said soluble agent in each of said perforate receiving means, means below said perforate receiving means adapted to direct such delivered portions downwardly out of contact with said soluble agent, tank means below said directing means adapted to receive said measured portions of liquid after said contact, and discharge means communicating with said tank and opening outside said tank at a level somewhat below said liquid supply means.

16. An apparatus for supplying soluble agents to liquids as set forth in claim 15, and comprising in addition, partition means dividing said soluble agent receptacle into two separate receptacles, each in communication with a respective perforate receiving means.

17. An apparatus for supplying soluble agents to liquids comprising a receptacle for soluble agent, perforate means disposed below said receptacle at opposite ends thereof in communication therewith so as to receive soluble agent therefrom by gravity, liquid supply means, measuring means in position to receive liquid from said liquid supply means, said measuring means comprising a pivotally mounted measuring bucket provided with two similar compartments at opposite sides of the pivotal axis thereof, each adapted to alternately receive liquid from said liquid supply means and deliver a measured portion of such liquid alternately to each of said perforate receiving means in dissolving contact with soluble agent therein, means below said perforate receiving means adapted to direct such delivered portions downwardly out of contact with said soluble agent, tank means below said directing means adapted to receive said measured portions of liquid after said contact, and discharge means communicating with said tank.

18. An apparatus for supplying soluble agents to liquids as set forth in claim 17 and comprising in addition partition means dividing said soluble agent receptacle into two separate receptacles, each in communication with a respective perforate receiving means.

19. An apparatus for supplying soluble agents to liquids comprising a receptacle for soluble agent, perforate means disposed below said receptacle at opposite ends thereof and in communication therewith so as to receive soluble agent therefrom by gravity, liquid supplying means, measuring means in position to receive liquid from said liquid supply means and adapted to alternately deliver successive measured portions of liquid into dissolving contact with said soluble agent in each of said perforate receiving means, means below said perforate receiving means adapted to direct such delivered portions downwardly out of contact with said soluble agent, said perforate receiving means comprising a screen open at the upper end to communication with said receptacle and surrounded by a housing adapted to receive said measured liquid portions from said measuring means and direct said portions into dissolving contact with said soluble agent through said screen and having a restricted discharge opening at the bottom portion thereof adapted to slowly deliver said measured portion downwardly out of contact with said soluble agent, tank means below said housing means adapted to receive said measured portions of liquid after said dissolving contact, and discharge means communicating with said tank.

20. An apparatus for supplying soluble agents to liquids as set forth in claim 19, and comprising in addition, partition means dividing said soluble agent receptacle into two separate receptacles, each in communication with a respective perforate receiving means.

21. An apparatus for supplying soluble agents to liquids comprising a receptacle for a soluble agent, perforate means disposed below said receptacle at opposite ends thereof and in communication therewith so as to receive soluble agent therefrom by gravity, liquid supply means, measuring means in position to receive liquid from said liquid supply means, said measuring means comprising a pivotally mounted measuring bucket provided with two similar compartments adjacently disposed on opposite sides of the pivotal axis of said bucket, each adapted to alternately receive liquid from said liquid supply means and deliver a measured portion of such liquid alternately to each of said perforate receiving means in dissolving contact with soluble agent in said receiving means, said measuring bucket being rotatable about an axis substantially vertically below said liquid supply means and below the center of gravity of said measuring bucket, stop means adapted to limit the rotation of said measuring bucket in such manner as to cause a jarring of said receptacle, means below said perforate receiving means adapted to direct such delivered portions downwardly out of contact with said soluble agent, tank means below said directing means adapted to receive said measured portions of liquid after said dissolving contact, and discharge means communicating with said tank.

22. An apparatus for supplying soluble agents to liquids as set forth in claim 21, and comprising in addition, partition means dividing said soluble agent receptacle into two separate receptacles, each in communication with a respective perforate receiving means.

In testimony whereof I have hereunto subscribed my name this 25th day of September, 1931.

EUGENE L. PRIZER.